United States Patent [19]

Kurusu et al.

[11] Patent Number: 4,870,454

[45] Date of Patent: Sep. 26, 1989

[54] APPARATUS FOR AND METHOD OF STABILIZING THE QUANTITY OF LIGHT OF FLUORESCENT LAMP

[75] Inventors: Yasuo Kurusu, Kamikyo; Kazuma Kan; Hiroshi Tamura, both of Hikone, all of Japan

[73] Assignee: Dainippon Screen Mfg. Co., Ltd., Japan

[21] Appl. No.: 202,985

[22] Filed: Jun. 6, 1988

[30] Foreign Application Priority Data

Jun. 4, 1987 [JP] Japan ................................ 62-139008
Jan. 25, 1988 [JP] Japan ................................ 63-15075

[51] Int. Cl.[4] ................................ G03B 27/72
[52] U.S. Cl. ................................ 355/69; 355/30; 355/229
[58] Field of Search ................ 355/69, 14 E, 14 R, 355/30; 313/13, 15, 44; 315/DIG. 5, DIG. 7, 307

[56] References Cited

U.S. PATENT DOCUMENTS 4,117,375 9/1978 Bachur et al. .................... 355/69 X
4,124,294 11/1978 Nakamura ........................ 355/69 X
4,624,547 11/1986 Endo et al. ...................... 355/69 X

FOREIGN PATENT DOCUMENTS 0187920 11/1983 Japan ................................ 355/30

*Primary Examiner*—L. T. Hix
*Assistant Examiner*—D. Rutledge
*Attorney, Agent, or Firm*—Ostrolenk, Faber, Gerb & Soffen

[57] ABSTRACT

An apparatus for and a method of stabilizing the quantity of light of a fluorescent lamp employed for illuminating an original to be duplicated or the like. The quantity of light of a fluorescent lamp reflected by a reference plane is detected, when scanning of an original is started, to control tube current of the fluorescent lamp on the basis of a detection signal, to thereby perform feedback control so that a detected light quantity value reaches a constant value. When the detected light quantity value reaches a prescribed value, the feedback control is released and the detected light quantity value is held to control the tube current of the fluorescent lamp on the basis of the held detected light quantity value. Thus, the tube current of the fluorescent lamp is adjusted to be constant on the basis of the held detected light quantity value during a scanning interval for the original to be duplicated, whereby the quantity of light of the fluorescent lamp is stabilized.

21 Claims, 7 Drawing Sheets

APPARATUS FOR AND METHOD OF STABILIZING THE QUANTITY OF LIGHT OF FLUORESCENT LAMP

BACKGROUND OF THE INVENTION

1. Field of the Invention

The present invention relates to an apparatus for stabilizing the quantity of light of a fluorescent lamp. The lamp may be employed for illuminating an original picture in a system for duplicating pictures through an optical system by a photoengraving process, and the present invention also relates to a method of stabilizing the quantity of light of a fluorescent lamp.

2. Description of the Prior Art

A fluorescent lamp, which is generally employed as an illumination source, is also applicable in printing processes. Specifically, such a lamp is applicable in color separation processes for producing a color original picture. In such processes, the lamp operates as a cold light source having a relative spectral distribution substantially equal to spectral luminous efficacy and small calorific power. In particular, it is believed that a fluorescent lamp may be used in an image reader employing a recently developed semiconductor optical sensor such as a CCD since a light source such as a halogen lamp (which contains a large quantity of infrared rays as a spectral characteristic) degrades the quality of a duplicated picture image.

Nevertheless fluorescent light sources have not generally been employed in photoengraving processes.

This is because the quantity of light from a fluorescent light source is unstable for a while upon lighting such that the quantity of light fluctuates in a relatively short time. Thus, employment of a fluorescent lamp causes a problem in the field of photoengraving for scanning an original sequentially along lines to read image density information thereof in high density, since errors are caused in read data thereof if the quantity of light for illuminating the original fluctuates during the scanning interval. Therefore, a light source such as a halogen lamp has been employed, because the quantity of light from a halogen lamp fluctuates less.

On the other hand, a copying machine or the like generally requires a short time of about 1 sec. for reading an original (including that of a maximum size, A3: 297mm×420 mm), and hence a change in the quantity of light in such a short time can be neglected. Thus, in practice employment of a fluorescent light source causes no problem within a copying machine or the like.

Further, a scanner such as a facsimile also employs a fluorescent lamp as a light source. This is because in a facsimile an image is generally bilevellized in black and white with no intermediate density and a slight change in the quantity of light generally causes no problem.

The quantity of light of a fluorescent lamp is determined by the mercury vapor pressure in the fluorescent lamp and the tube current thereof. The mercury vapor pressure depends on the ambient temperature thereof, which also determines luminous efficiency. In more concrete terms, the lowest point (hereinafter referred to as "coldest point") of the tube wall temperature of the fluorescent lamp determines the mercury vapor pressure as well as the luminous efficiency of the fluorescent lamp. Therefore, the luminous efficiency of the fluorescent lamp can be controlled by providing the coldest point in some portion on the tube wall of the fluorescent lamp and controlling the temperature thereof. On the other hand, the quantity of light of the fluorescent lamp can be stabilized by appropriately controlling its tube current.

FIG. 1 shows an apparatus which has been proposed in the art to stabilize the quantity of light of a fluorescent lamp and distribution thereof. Referring to FIG. 1, light from a fluorescent lamp 1 is received by an optical sensor 2 for monitoring the quantity of light, and output from the optical sensor 2 is inputted in a light quantity feedback unit 4 through an amplifier 3. Output (tube current control signal) from the light quantity feedback unit 4 is supplied to a fluorescent lamp inverter 5, which in turn supplies appropriate tube current to the fluorescent lamp 1 in response to the tube current control signal. The light quantity feedback unit 4 is adapted to control the fluorescent lamp inverter 5 in response to the level of the signal from the optical sensor 2 for adjusting the tube current to be fed to the fluorescent lamp 1, thereby to regularly maintain the output level of the optical sensor 2 at a constant value.

On the other hand, a cooling device 6 such as a Peltier device is brought into contact with a prescribed tube wall portion of the fluorescent lamp 1, in order to control the position and the temperature of the coldest point of the fluorescent lamp 1. A temperature sensor 7 such as a thermister is interposed between the cooling device 6 and the tube wall. The cooling device 6 is controlled by a cooling device driver 8 in response to a value detected by the temperature sensor 7, so that the temperature of the coldest point is maintained at a desired value.

In order to reliably maintain the portion provided with the cooling device 6 as the coldest point, heaters 9 are serially provided in appropriate pitches on the tube wall of the fluorescent lamp 1 except for the portion being in contact with the cooling device 6. A temperature sensor 10 such as a thermister is provided in an appropriate position on the tube wall of the fluorescent lamp 1. The heaters 9 are controlled by temperature control means (not shown) in response to a value detected by the temperature sensor 10, to heat the tube wall of the fluorescent lamp 1, being in contact with the heaters 9, up to a prescribed temperature exceeding that of the coldest point.

In the conventional apparatus as shown in FIG. 1, a desired effect of stabilizing the quantity of light can be attained when the optical sensor 2 receives only the light from the fluorescent lamp 1. If the apparatus is applied to an image scanner, however, an error may be caused since the optical sensor 2 receives light reflected by the surface of an original to be duplicated in addition to the light directly received from the fluorescent lamp 1.

When an original has variable-density gradation, the quantity of light received by the optical sensor 2 is reduced during scanning of a high-density region (dark part) of the original as compared with that during scanning of a low-density region (bright part), whereby the light quantity feedback unit 4 controls the fluorescent lamp inverter 5 to increase the tube current of the fluorescent lamp 1, similarly to the case where the quantity of light of the fluorescent lamp 1 is reduced. During scanning of the low-density region of the original, on the other hand, the light quantity feedback unit 4 controls the fluorescent lamp inverter 5 to reduce the tube current of the fluorescent lamp 1. Therefore, it is impossible to control the fluctuation of the quantity of light of the fluorescent lamp 1 in the accuracy required for scanning of an original in a photoengraving process preferably within about 1%), in the apparatus shown in FIG. 1. Namely, the apparatus shown in FIG. 1 cannot control fluctuation in the quantity thereof within 1%.

A change in density of the original exerts an influence on the quantity of light received by the optical sensor 2 wherever the optical sensor 2 is provided. This presents an inconvenience which cannot be eliminated so far as light quantity feedback control is effectuated during scanning of an original.

SUMMARY OF THE INVENTION

An apparatus for stabilizing the quantity of light of a fluorescent lamp according to the present invention comprises a fluorescent lamp, light quantity detecting means for detecting the quantity of light of the fluorescent lamp, feedback means for controlling the tube current of the fluorescent lamp on the basis of the light quantity value detected by the light quantity detecting means thereby to perform feedback control so that the detected light quantity reaches a constant value and control means for releasing the feedback control by the feedback means when the detected light quantity value reaches a prescribed value and maintaining the currently detected light quantity value to thereby control the tube current of the fluorescent lamp on the basis of the detected light quantity value thus maintained.

A method of stabilizing the quantity of light of a fluorescent lamp according to the present invention comprises a first step of detecting the quantity of light of a fluorescent lamp to output a detection signal corresponding to the detected light quantity value, a second step of controlling tube current of the fluorescent lamp on the basis of the detection signal to perform feedback control so that the detected light quantity reaches a constant value and a third step of releasing the feedback control when the detected light quantity reaches a prescribed value and maintaining the detected light quantity value to control the tube current of the fluorescent lamp on the basis of the detected light quantity value thus maintained.

Accordingly, a principal object of the present invention is to provide an apparatus for and a method of stabilizing the quantity of light of a fluorescent lamp, which can stably maintain the quantity of light of the fluorescent lamp for a prescribed period of time required for scanning an original, without being influenced by variable density of the original to be duplicated.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
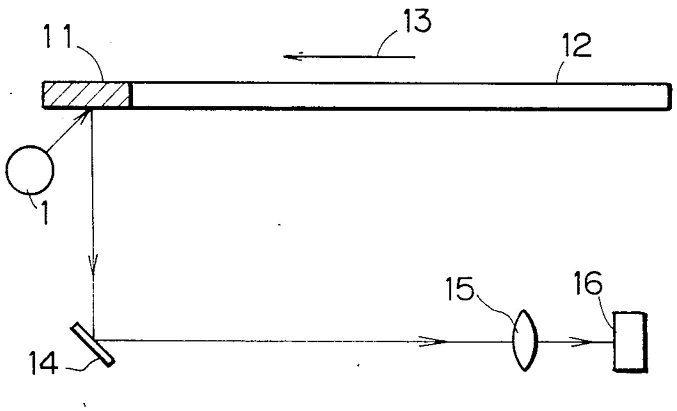
FIG. 2 schematically illustrates an exemplary original scanner to which the present invention is applied.

FIG. 2 schematically illustrates an exemplary original scanner to which the present invention is applied.

A white reference panel 11 and an original 12 to be duplicated are mounted on an original table (not shown), to be fed along arrow 13 by appropriate driving means.

Light from a fluorescent lamp 1 impinges on the white reference panel 11 and then on the original 12 to be duplicated. The light is reflected by the white reference panel 11 or the original 12 to be duplicated and its direction is changed by a mirror 14, to be projected on a photoelectric element 16 such as a CCD through a lens 15, for image formation. The photoelectric element 16 outputs an image signal of the original 12 to be duplicated.

The present invention is directed to a method of and an apparatus for stabilizing the quantity of light of the fluorescent lamp 1 in such a scanner or the like.

(1) First Embodiment

Figure 1:
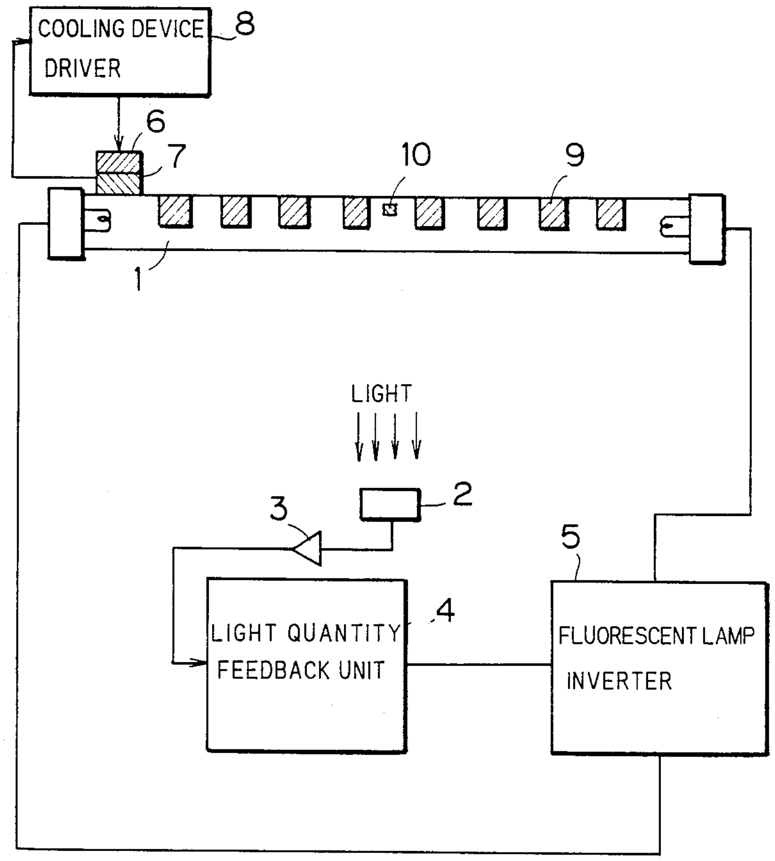
FIG. 1 (PRIOR ART)
FIG. 1 illustrates a conventional apparatus for stabilizing the quantity of light of a fluorescent lamp.
Figure 3:
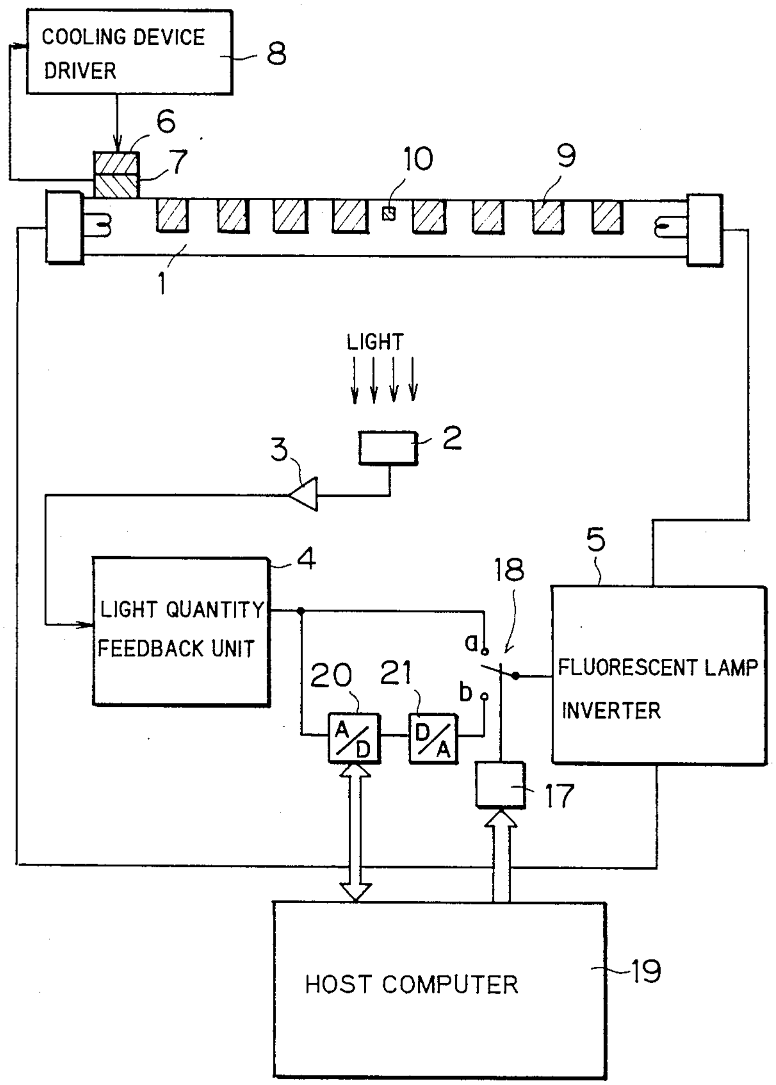
FIG. 3 is a block diagram showing a first embodiment of an apparatus for stabilizing the quantity of light of a fluorescent lamp according to the present invention.

FIG. 3 is a block diagram showing a first embodiment of the present invention. The apparatus is different from the conventional apparatus shown in FIG. 1 in that a switch driver 17, a switch 18, a host computer 19, an A-D converter 20 and a D-A converter 21 are additionally provided. An output side of a light quantity feedback unit 4 is connected to an "a" contact side of the switch 18, opening/closing of which is controlled by the switch driver 17. The switch driver 17 is controlled by the host computer 19. The output side of the light quantity feedback unit 4 is also connected to a "b" contact side of the switch 18 through the A-D converter 20 and the D-A converter 21, and the A-D converter 20 is also controlled by the host computer 19. When the switch 18 is switched toward the "a" contact in a first mode, output (tube current control signal) from the light quantity feedback unit 4 is directly supplied to a fluorescent lamp inverter 5. On the other hand, the output from the light quantity feedback unit 4 is inputted in the fluorescent lamp inverter 5 through the A-D converter 20 and the D-A converter 21 when the switch 18 is switched to the "b" contact side in a second mode. The host computer 19 is adapted to output an A-D conversion command signal to the A-D converter 20 as well as a switching command signal to the switch driver 16. The host computer 19 also has a function of reading an output value (tube current control value) of the light quantity feedback unit 4, which is converted to a digital value thereof by the A-D converter 20. Other structure of the first embodiment is identical to that of the conventional apparatus shown in FIG. 1.

Operation of the apparatus shown in FIG. 3 is performed sequentially along the following steps:

(A) First, power is applied to start a cooling device 6 and heaters 9, and the apparatus waits for a prescribed time (about several minutes) until the temperature of a fluorescent lamp 1 is brought into an equilibrium state. The fluorescent lamp 1 is not turned on during such a standby time.

The step (A) is generally performed at the start of daily operations.

(B) The switch 18 is switched toward the "a" contact by the switch driver 17, to turn on the fluorescent lamp 1. A reference density image and an original to be duplicated are mounted on a scanned plane, and then the quantity of light incident upon an optical sensor 2 is set to be at a constant value for calibration during scanning of the reference density image. The white reference panel 11 (FIG. 2) is preferably employed as the reference density image.

(C) After a lapse of several seconds after step (B), the host computer 19 supplies an A-D conversion command to the A-D converter 20, which in turn converts a tube current control value outputted from the light quantity feedback unit 4 to the digital value thereof. The converted digital value thereof is held in the A-D converter 20 until a subsequent A-D conversion command from the host computer 19 is received in the A-D converter 20, while being transferred to the D-A converter 21 in the subsequent stage, to be converted to the analog value thereof by the same.

(D) The switch 18 is switched toward the "b" contact by the switch driver 17, through a command from the host computer 19. Thus, the constant value (tube current control value) held in the A-D converter 20 is inputted in the fluorescent lamp inverter 5 through the switch 18, thereby to constantly maintain the tube current value of the fluorescent lamp 1.

The position and temperature of the coldest point of the tube wall are held at constant values throughout the operation, and hence there is no change in the quantity of light and light quantity distribution of the fluorescent lamp 1 after steps (B) to (D) are performed.

(E) The original to be duplicated, which is serially provided in a stage subsequent to the reference density image (white reference panel) for calibration, is scanned.

(F) The fluorescent lamp 1 is turned off when scanning of the original is terminated. If further scanning is required, the scanning may be continued without turning off the fluorescent lamp 1. For efficiency, the cooling device 6 and the heaters 9 are preferably continuously energized until daily operations are terminated.

(G) To scan an original after the lamp is turned off, steps (B) to (F) are repeated.

Through the aforementioned procedure, the reference density image is scanned to obtain a suitable tube current control value (step (B)) as well as to hold the value (step (C)), while the tube current of the fluorescent lamp 1 is controlled on the basis of the value during scanning of the original to be duplicated, whereby the quantity of light and light quantity distribution of the fluorescent lamp 1 can be stabilized with no influence being exerted by the density of the original to be duplicated.

During step (C), the output value of the light quantity feedback unit 4, i.e., the tube current control signal for commanding an increase/decrease of the tube current to the fluorescent lamp inverter 5 on the basis of a change in the quantity of light of the fluorescent lamp 1, is converted to the digital value thereof by the A-D converter 20 to be transferred to the host computer 19 for display. Thus, one will know when it is time to exchange the fluorescent lamp 1 for a new lamp.

It is known that the tube current of the fluorescent lamp 1 must be increased in order to obtain a constant quantity of light thereof in the last stage of its lifetime. Thus, the value of the tube current control signal transferred to the host computer 19 is so digitally displayed on display means during step (C) that the time for exchanging the fluorescent lamp 1 can be recognized with great precision.

In the above description, the converted digital value does not directly indicate the tube current value. Rather, the tube current value is indirectly indicated by the converted digital value. For example a converted digital value of "100" may indicate a tube current value of "200 mA", and a coverted digital tube of "1000" may indicate a tube current value of "400 mA".

(2) Second Embodiment

Figure 4:
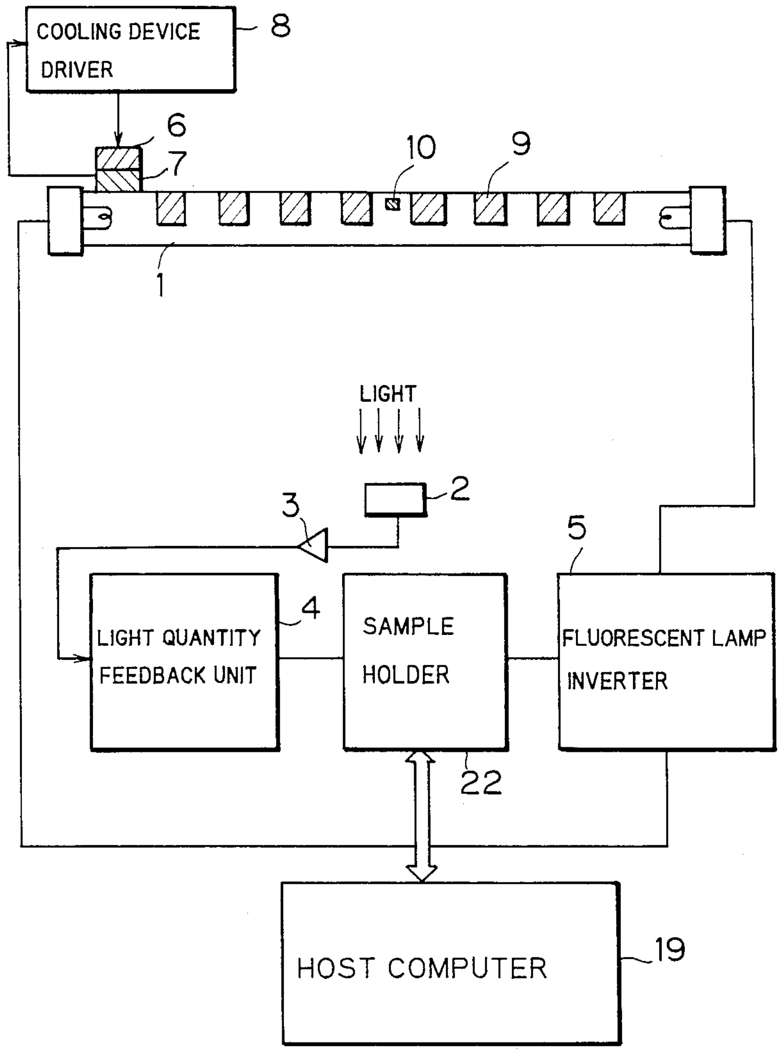
FIG. 4 is a block diagram showing a second embodiment of an apparatus for stabilizing the quantity of light of a fluorescent lamp according to the present invention.

FIG. 4 is a block diagram showing a second embodiment of the present invention.

The apparatus shown in FIG. 4 is provided with a sample holder 22 in place of the switch driver 17, the switch 18, the A-D converter 20 and the D-A converter 21 of the first embodiment shown in FIG. 3. Other structure of the second embodiment is similar to that of the first embodiment.

The sample holder 22 is selectively switched by a mode switching signal supplied from a host computer 19 to a first mode for passing a tube current control signal outputted from a light quantity feedback unit 4 and a second mode for holding the tube current control signal.

Therefore, the sample holder 22 must be prepared by that of a small droop rate, i.e., that causing no or substantially no change in the tube current control signal held in the same.

The operation of the apparatus shown in FIG. 4 is performed sequentially along the following steps:

(A) Similarly to the step (A) of the first embodiment, power is applied to start a cooling device 6 and heaters 9, and the apparatus waits for several minutes until an equilibrium state is attained.

(B) The sample holder 22 is brought into a sample state, i.e., a state in which the tube current control signal from the light quantity feedback unit 4 is directly inputted in a fluorescent lamp inverter 5 to effectuate feedback control, to turn on the fluorescent lamp 1. At this time, a reference density image (white reference panel) and an original to be duplicated are mounted on a scanned plane similarly to the first embodiment, so that the reference density image is scanned first.

(C) Upon a lapse of several seconds from step (B), the sample holder 22 is switched into a hold state by a command from a host computer 19, to hold the tube current control value.

Thus, the fluorescent lamp inverter 5 supplies to the fluorescent lamp 1 a tube current of constant value corresponding to the held tube current control signal, to stabilize the quantity of light and light quantity distribution of the lamp.

(D) The reference density image (white reference panel) is scanned and then a desired original to be duplicated is scanned.

(E) The fluorescent lamp 1 is turned off when scanning of the original is terminated. If further scanning is required, the scanning is continued without turning off the fluorescent lamp 1.

(F) In order to re-start the apparatus after the fluorescent lamp 1 is truned off, steps (B) to (E) are repeated.

Also in the apparatus shown in FIG. 4, the tube current supplied to the fluorescent lamp 1 during scanning of the original has a constant value corresponding to the value of the tube current control signal held in the sample holder 22 during step (C) similarly to the first embodiment, whereby the quantity of light and light quantity distribution of the fluorescent lamp 1 can be stabilized if the position and temperature of the coldest point are constant held.

(3) Third Embodiment

Figure 5:
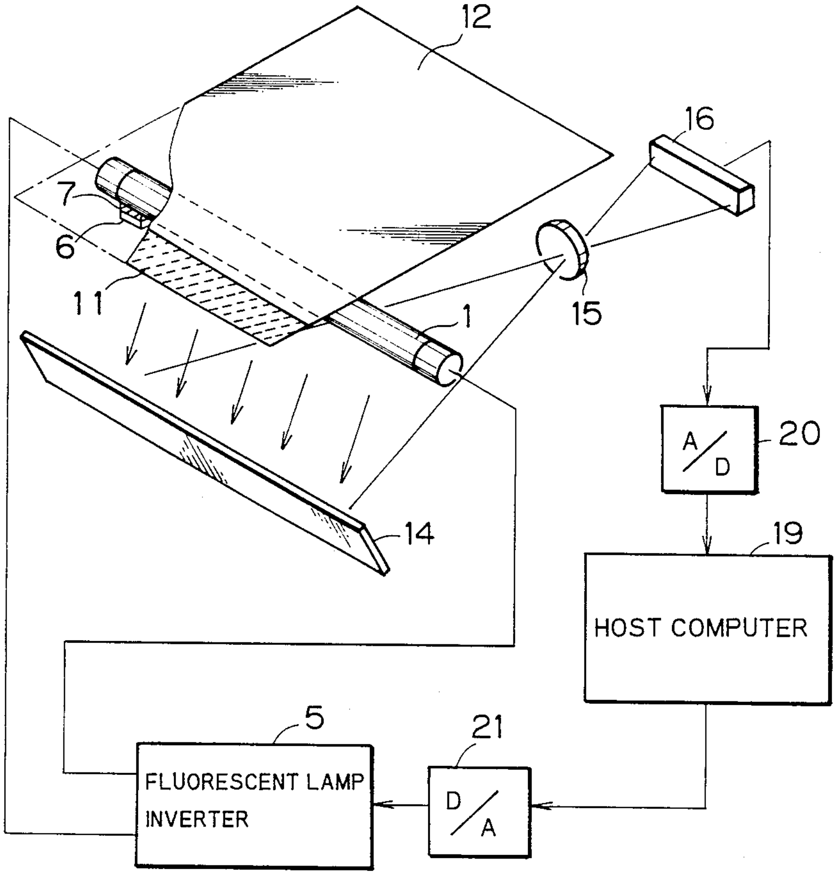
FIG. 5 is a perspective view showing a third embodiment of an apparatus for stabilizing the quantity of light of a fluorescent lamp according to the present invention.

In a third embodiment of the present invention, no independent optical sensor is employed for detecting the quantity of light of a fluorescent lamp. Rather, a line sensor, such as a CCD for picking up an image signal in line-sequential scanning on an original, is used to stabilize/control the quantity of light of the fluorescent lamp. FIG. 5 is a perspective view schematically showing the third embodiment.

As shown in FIG. 5, a cooling device 6, a temperature sensor 7 and heaters (not shown) are provided on the tube wall of a fluorescent lamp 1 to constantly hold the position and the temperature of the coldest point, similarly to the embodiments shown in FIGS. 3 and 4.

A scanned plane illuminated by the fluorescent lamp 1 is provided thereon with a white reference panel 11 serving as a calibrated reference density image and with an original 12 to be duplicated in duplication/scanning of an image. Light reflected by the same is projected on a CCD line sensor 16 by a mirror 14 and a lens 15, for image formation. A douser (not shown) is provided on the fluorescent lamp 1, so that no light can directly enter the lens 15.

An output signal from the CCD line sensor 16 is inputted in a host computer 19 through an A-D converter 20, so that the host computer 19 outputs a tube current control value to a fluorescent lamp inverter 5 through a D-A converter 21 on the basis of the data.

Operation of the apparatus shown in FIG. 5 is performed sequentially along the following steps:

(A) Power is applied to drive the cooling device 6 and the heaters, and a standby time is provided to stabilize the temperature of the fluorescent lamp 1, similarly to the first and second embodiments.

(B) The host computer 19 outputs a tube current control value to the fluorescent lamp inverter 5 through the D-A converter 21, to turn on the fluorescent lamp 1. The tube current control value thus designated is indicated by symbol "A". The designated value is substantially constant if the fluorescent lamp 1 is new.

(C) A reference density image (white reference panel 11) is aligned with a scanned position, to be projected on the CCD line sensor 16 by the lens 15 for image formation. The line sensor 16 outputs a light quantity signal of a level responsive to the quantity of light incident on the sensor. The signal is transferred to the host computer 19 through the A-D converter 20.

(D) The host computer 19 determines whether or not the quantity of light of the fluorescent lamp 1, being in an ON state, is at a proper level by the transferred data. Such a determination is made by comparing the quantity of light with a previously set value of an appropriate level.

(E) If a determination is made that the quantity of light is at a proper level, the designated tube current control value "A" is held and then an original to be duplicated is scanned.

(F) If the quantity of light is determined to be improper, the host computer 19 calculates the amount for increasing/decreasing the tube current value, to input/set a tube current control value "A′" corresponding to the amount in the fluorescent lamp inverter 5 through the D-A converter 21. If the quantity of light is still improper after such correction, the same operation is repeated until the quantity of light reaches a proper level. When a desired level is attained, the host computer 19 records the corrected tube current control value "A′" as "A". That is, the host computer 19 performs an operation of "A′→A". Thus, the fluorescent lamp 1 is supplied the tube current corresponding to the tube current control value "A′" by the fluorescent lamp inverter 5, to maintain the proper quantity of light for scanning the original.

(G) When scanning of the original is completed, the fluorescent lamp 1 is turned off. If further scanning is required, the scanning is continued without turning off the fluorescent lamp 1.

(H) In order to re-start the operation after the fluorescent lamp 1 is turned off, steps (B) to (G) are repeated.

Also in the apparatus shown in FIG. 5, the tube current control value is constantly controlled by the host computer 19, whereby the quantity of light and light quantity distribution can be stabilized if the position and temperature of the coldest point are constantly maintained.

Further, it is possible to recognize the last stage of the fluorescent lamp's 1 life-time by displaying the corrected tube current value calculated during step (F) on an appropriate display means, similarly to the first embodiment.

The third embodiment requires no optical sensor since the quantity of light of the fluorescent lamp 1 is detected by the line sensor 16. Further, the host computer 19 is also adopted to perform feedback control, whereby the light quantity feedback unit, which is required in each of the first and second embodiments, can be omitted.

Although the white reference panel 11 (shown in FIG. 2) is employed as a reference density image in each of the aforementioned embodiments, the reference density image is not restricted to such a panel. For example, a gray reference panel may be employed as the reference density image, to obtain a tube current control value for stabilizing the quantity of light.

(4) Fourth Embodiment

Figure 6:
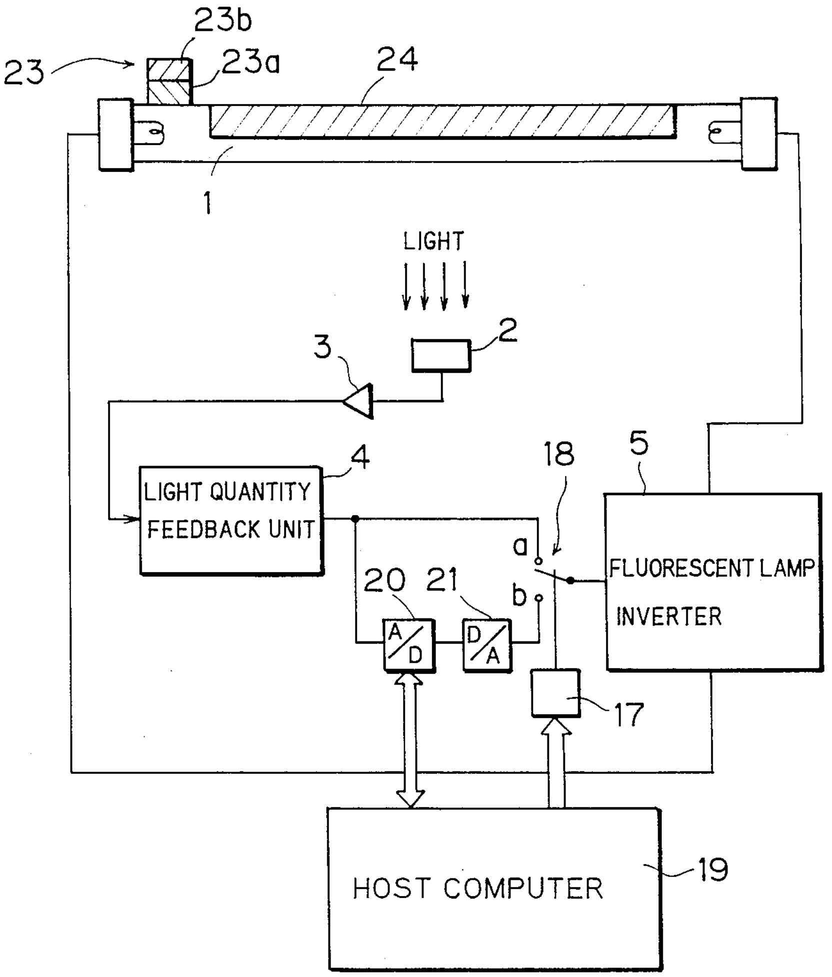
FIG. 6 is a block diagram showing a fourth embodiment of an apparatus for stabilizing the quantity of light of a fluorescent lamp according to the present invention.

FIG. 6 is a block diagram showing an apparatus according to a fourth embodiment of the present invention.

In the embodiment shown in FIG. 6, in place of the cooling device 6, the temperature sensor 7, the cooling device driver 8, the heaters 9 and the temperature sensor 10 in the first embodiment as shown in FIG. 3, a heater 24 is provided in contact with a substantially central tube wall portion of a fluorescent lamp 1 except for portions for extracting light from the fluorescent lamp 1, while a thermal conduction buffering member 23, being formed by a heat transfer layer 23*a* of aluminum etc. and a heat storage layer 23*b* of glass etc., is provided in contact with an end portion of the tube wall. A temperature sensor (not shown) such as a thermister is provided on the surface of the heater 24, so that the heater 24 is controlled by temperature control means (not shown) in response to a value detected by the temperature sensor to heat the portion of the tube wall of the fluorescent lamp 1 which is in contact with the heater 24 to a prescribed temperature exceeding that of the coldest point. Thus, the portion of the tube wall of the fluorescent lamp 1 which is in contact with the thermal conduction buffering member 23 will be maintained at a prescribed coldest point temperature. Other structure shown in FIG. 6 is similar to that of the apparatus according to the first embodiment.

Although the heater 24 is provided over the entire tube wall of the fluorescent lamp 1 except for the region provided with the thermal conduction buffering member 23 in order to reliably bring the portion provided with the thermal conduction buffering member 23 into the coldest temperature, the heater may be replaced by a plurality of heaters which are serially provided in appropriate pitches similarly to the first to third embodiments.

In the thermal conduction buffering member 23, the heat transfer layer 23*a* is so connected that one surface thereof is in contact with the tube wall of the fluorescent lamp 1 and the other surface thereof is overlapped with the heat storage layer 23*b*. Silicon grease members (not shown) are interposed between surfaces of the heat transfer layer 23*a* and the fluorescent lamp 1 and between surfaces of the heat transfer layer 23*a* and the heat storage layer 23*b*, respectively.

Figure 7:
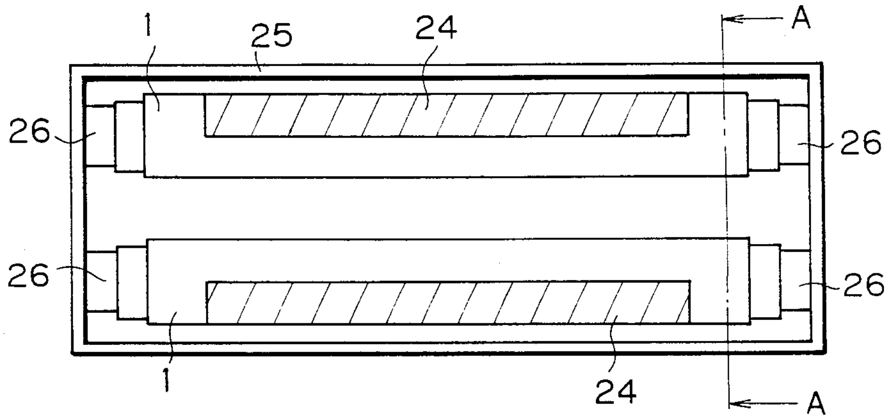
FIG. 7 illustrates the fluorescent lamp shown in FIG. 6.
Figure 8:
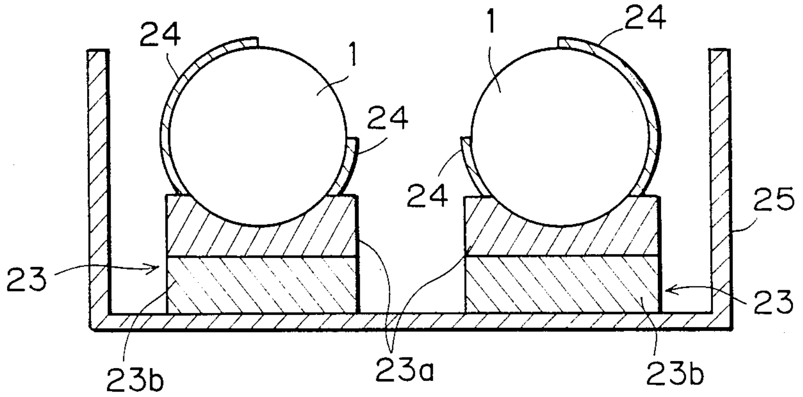
FIG. 8 is a sectional view taken along the line A—A in FIG. 7.
Figure 9:
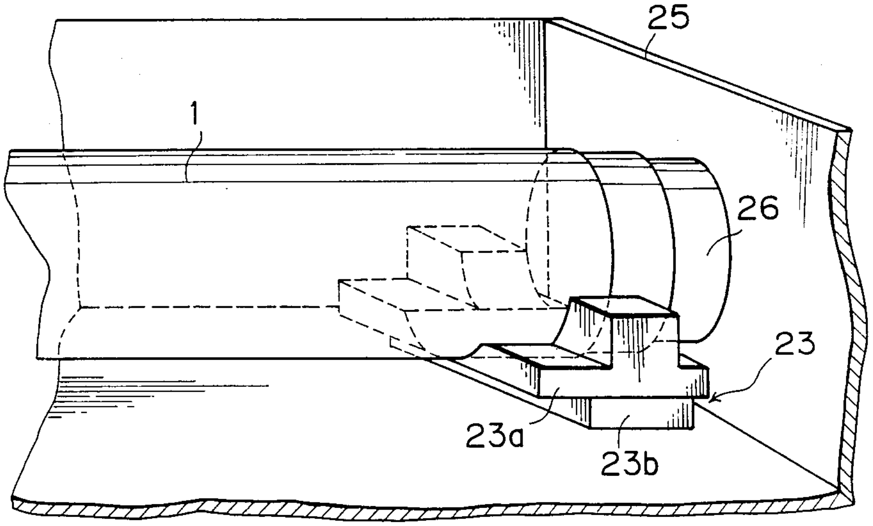
FIG. 9 is a perspective view showing one end portion of the fluorescent lamp shown in FIG. 7.

FIG. 7 illustrates the fluorescent lamp 1 shown in FIG. 6. FIG. 8 is a sectional view taken along the line A—A in FIG. 7. FIG. 9 is a perspective view showing an end of the fluorescent lamp 1 shown in FIG. 7. Two such fluorescent lamps 1 are stored in a body case 25 of aluminum having a U-shaped sectional configuration in a parallel manner, to be fixed by holders 26 provided on both ends of the body case 25.

Operation of the fourth embodiment is similar to that of the first embodiment shown in FIG. 3 except for a step (A), at which the temperature of the fluorescent lamp 1 is brought into an equilibrium state upon power supply.

In the fourth embodiment, the heater 24 is started upon power supply. The heater 24 is so controlled by the temperature control means (not shown) that the surface temperature of the fluorescent lamp 1 measured by the temperature sensor reaches a constant level exceeding the coldest point temperature (48° C.). At this time, the thermal conduction buffering member 23 is in contact with a part of the tube wall of the fluorescent lamp 1 to naturally release heat on the tube wall of the fluorescent lamp 1 to the exterior and cool the same, whereby the said tube wall part of the fluorescent lamp 1 being in contact with the thermal conduction buffering member 23 is cooled to a constant temperature which is lower than the tube wall temperature of the fluorescent lamp 1 in another portion. Such control of the coldest point temperature is performed continuously during energization of the heater 24, i.e., generally from start to end of daily operations.

In the apparatus shown in FIG. 6, the thermal conduction buffering member 23 for forming the coldest point of the fluorescent lamp 1 includes a heat storage layer 23*b* having low thermal conductivity. Thus, even if the ambient temperature of the thermal conduction buffering member 23 is abruptly changed (for example, by change in the room temperature during an original scanning interval of about one to two minutes), the coldest point of the tube wall of the fluorescent lamp 1 is hardly influenced by the ambient temperature. This is because the heat storage layer 23*b* performs a heat storage function. Therefore, substantially no fluctuation in the coldest point temperature can occur during the original scanning interval in the aforementioned apparatus. Thus change in the quantity of light of the fluorescent lamp 1 is prevented.

Figure 10:
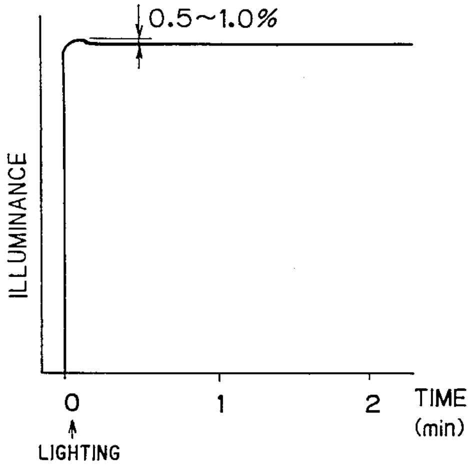
FIG. 10 illustrates change in the quantity of light upon lighting of the fluorescent lamp in the apparatus shown in FIG. 6.

FIG. 10 is a graph showing the result of a test for measuring actual change in the quantity of light of the fluorescent lamp 1 when the same was turned on after its temperature was brought into an equilibrium state in the apparatus shown in FIG. 6. Referring to FIG. 10, the horizontal axis indicates time elapsed upon lighting, and the vertical axis indicates illuminance at a substantially central portion of the fluorescent lamp 1. As apparent from FIG. 10, illuminance reached a certain value shortly after the lighting of the fluorescent lamp 1, and then the value was lowered by about 0.5 to 1.0% to be stabilized at a substantially constant level. A similar result was obtained whenever the room temperature was within a range of 10 to 40[°C.]. When the room temperature was abruptly changed with the quantity of light being stabilized, substantially no change was recognized in the quantity of light during an interval of about one to two minutes (which is, in general, the internal required for scanning an original.) This means that the apparatus shown in FIG. 6 is excellent in stabilizing the quantity of light.

Although the heat storage layer 23*b* is made of glass in the above embodiment, the same may alternatively be formed of another material having low thermal conductivity. Table 1 shows the coldest point temperatures actually measured with heat storage layers 23*b* of alumina, 18-8 stainless steel and polyethylene at room temperatures of 10[°C.] and 40[°C.].

TABLE 1

| Material | Room Temperature 10[°C.] | Room Temperature 40[°C.] |
|---|---|---|
| Alumina | 26 | 49 |
| 18-8 Stainless Steel | 32 | 51 |
| Polyethylene | 46 | 61 |

Table 1 suggests that alumina, 18-8 stainless steel and polyethylene are also employable as materials for the heat storage layer 23*b*, and that such materials attain an effect similar to that atained when the heat storage layer 23*b* is made of glass. In any case, control temperatures of the temperature sensor are set at levels higher by several degrees than the temperatures listed in Table 1, in order to ensure the coldest point temperature.

It has been experimentally determined that luminous efficiency of a fluorescent lamp is at a maximum when the coldest point temperature is about 40[°C.]. In obtaining this value, the fluorescent lamp was left in a constant temperature bath maintained at about 40[°C.] for two hours with no preheating means such as a heater, and thus the quantity of initial light flux obtained upon lighting of this fluorescent lamp was at the maximum. It has been confirmed that the coldest point temperature is preferably maintained at about 40[°C.] under different conditions such as that of continuous lighting.

(5) Fifth and Sixth Embodiments

Although the position and temperature of the coldest point of the fluorescent lamp 1 are controlled by the cooling device 6, the temperature sensor 7 and the cooling device driver 8 shown in FIG. 4 or 5 in each of the second and third embodiments, such control may be performed by bringing a thermal conduction buffering member 23, which is formed by a heat transfer layer 23*a* of aluminum etc. and a heat storage layer 23*b* of glass etc., into contact with a prescribed position on the tube wall of a fluorescent lamp 1 similarly to the fourth embodiment.

Such operation (fifth or sixth embodiment) is similar to the second or third embodiment, and the effect thereof is equal to that of the second or third embodiment.

In the fifth or sixth embodiment, heaters 9 are serially provided at appropriate pitches on a tube wall region of the fluorescent lamp 1 other than a region being in contact with the thermal conduction buffering member 23 similarly to the second or third embodiment, in order to reliably maintain the portion provided with the thermal conduction buffering member 23 as the coldest point. However, a heater may alternatively be provided entirely over such a region, similarly to the fourth embodiment.

(6) Other Embodiments

Figure 11:
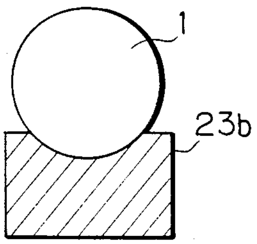
FIGS. 11 to 13 are sectional views showing modifications of a thermal conduction buffering member employed in the present invention.
Figure 12:
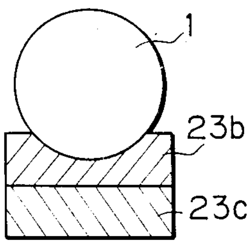
Figure 13:
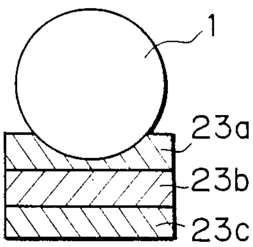

Although the heat transfer layer 23*a* and the heat storage layer 23*b* overlap each other to form the thermal conduction buffering member 23 with the heat transfer layer 23*a* being brought into contact with the tube wall of the fluorescent lamp 1 in each of the fourth to sixth embodiments, a thermal conduction buffering member 23 may be formed only by a heat storage layer 23*b* shown as in FIG. 11. Or, a thermal conduction buffering member 23 may be formed by a heat radiation layer 23*c* of a material having high thermal conductivity such as aluminum and a heat storage layer 23*b* as shown in FIG. 12, with the heat storage layer 23*b* being in contact with the tube wall of a fluorescent lamp 1. Alternatively, a heat transfer layer 23*a* and a heat radiation layer 23*c* may overlap on both sides of a heat storage layer 23*b* to form a thermal conduction buffering member 23 shown in FIG. 13, with the heat transfer layer 23*a* being brought into contact with the tube wall of a fluorescent lamp 1. In any case, an effect similar to that of each of the aforementioned embodiments can attained.

Although the above description has been made with reference to an original scanner of a photoeletric scanning type, the present invention is not so restricted. The present invention is also applicable to that of a pure optical type, which projects an original image on a photosensitive material surface through an image forming lens.

Further, although each of the aforementioned embodiments has been described with respect to a reflective type apparatus for scanning an original, the present invention is also applicable to a transmission type, apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A light quantity stabilizing apparatus, comprising:
- a fluorescent lamp;
- an inverter for adjusting tube current flowing in said lamp in response to a tube current control signal;
- means for detecting the quantity of light of said fluorescent lamp that has first been reflected off a reference density image and for outputting a detection signal;
- a light quantity feedback means for outputting said tube current control signal for controlling said inverter in such a manner that a detection signal from said light quantity detecting means reaches a constant value; and
- means for holding steady said tube current control signal after said tube current control signal outputted from said light quantity feedback means reaches said constant value.

2. A light quantity stabilizing apparatus in accordance with claim 1, further including means for maintaining a first position on the tube wall of said fluorescent lamp at a constant, coldest point, surface temperature, said temperature being lower than the surface temperature of any other position on said tube wall.

3. A light quantity stabilizing apparatus in accordance with claim 2, wherein said temperature maintaining means includes:
- means for heating, controlling and detecting the surface temperature of said tube wall whereby a second position on said tube wall can be controlled by heating said second position to a prescribed temperature, said prescribed temperature being higher than said coldest point temperature;
- a cooling device which is in contact with said tube wall at said first position for cooling the tube wall at said first position to thereby maintain said first position at said coldest point temperature;
- a temperature sensor for detecting the temperature of said first position and for outputting a signal corresponding to said coldest point temperature; and
- a cooling device driver for driving said cooling device so as to maintain the temperature at said first position at a constant temperature on the basis of said signal outputted from said temperature sensor.

4. A light quantity stabilizing apparatus in accordance with claim 2, wherein said temperature maintaining means includes:
- means for heating, controlling and detecting the surface temperature of said tube wall whereby a second position on said tube wall can be controlled by heating said second position to a prescribed temperature, said prescribed temperature being higher than said coldest point temperature; and
- a thermal conduction buffering member, said member including a first heat storage layer, said layer being formed of a material having low thermal conductivity, said member being in contact with said tube wall at said first position.

5. A light quantity stabilizing apparatus in accordance with claim 4, wherein said thermal conduction buffering member further includes a second heat transfer layer, said second layer overlapping said first layer, said second layer having higher thermal conductivity than said first layer, said second layer being in contact with said tube wall.

6. A light quantity stabilizing apparatus in accordance with claim 4, wherein said thermal conduction buffering member further includes a heat radiation layer, said heat radiation layer overlapping said heat storage layer, said heat radiation layer having higher thermal conductivity than said heat storage layer, said heat storage layer being in contact with said tube wall.

7. A light quantity stabilizing apparatus in accordance with claim 4, wherein said thermal conduction buffering member further includes a heat transfer layer and a heat radiation layer, said heat transfer layer and said heat radiation layer overlapping both sides of said heat storage layer, said heat transfer layer and said heat radiation layer having higher thermal conductivity than said heat storage layer, and said heat transfer layer being in contact with said tube wall.

8. A light quantity stabilizing apparatus, comprising:

a fluorescent lamp;

an inverter for adjusting tube current flowing in said lamp;

means for detecting the quantity of light of said fluorescent lamp and for outputting a detection signal;

a light quantity feedback means for outputting a first analog tube current control signal for controlling said inverter so that a detection signal from said light quantity detecting means reaches a constant value;

an A-D converter for converting said first analog tube current control signal from said feedback unit to a digital tube current control signal;

a D-A converter for converting said digital tube current control signal to a second analog tube current control signal;

a switch for selectively switching between a first mode for supplying said first analog tube current control signal from said feedback unit to said inverter and a second mode for supplying said second analog tube current control signal to said inverter;

a switch driver for controlling said switch;

means for switching said switch into said first mode through said switch driver to make said feedback unit control said inverter so that said tube current of said fluorescent lamp reaches a constant value on the basis of said detection signal;

means for converting said first analog tube current control signal to said digital tube current control signal by said A-D converter after said tube current of said fluorescent lamp reaches said constant value, to thereby hold a converted value of said digital tube current control signal; and means for switching said switch to said second mode through said switch driver, to convert said digital tube current control signal to said second analog tube current control signal, and to supply said second analog tube current control signal to said inverter to control said inverter.

9. A light quantity stabilizing apparatus in accordance with claim 8, further including means for maintaining a first position on the tube wall of said fluorescent lamp at a constant, coldest point, surface temperature, said temperature being lower than the surface temperature of any other position on said tube wall.

10. A light quantity stabilizing apparatus, comprising:

a fluorescent lamp;

an inverter for adjusting tube current flowing in said lamp;

means for detecting the quantity of light of said fluorescent lamp and for outputting a detection signal;

a light quantity feedback means for outputting a tube current control signal for controlling said inverter so that a detection signal from said light quantity detecting means reaches a constant value;

a sample holder, said holder being selectively switchable between a first mode for passing said tube current control signal from said feedback unit and a second mode for holding said tube current control signal;

means for supplying a first mode switching signal to said sample holder to switch said sample holder to said first mode to thereby make said feedback unit control said inverter so that said tube current of said fluorescent lamp reaches said constant value on the basis of said detection signal; and means for supplying a second mode switching signal to said sample holder, after said tube current reaches said constant value, to switch said sample holder into said second mode to thereby make said sample holder hold said tube current control signal as well as to supply said held tube current control signal to said inverter.

11. A light quantity stabilizing apparatus in accordance with claim 10, further including means for maintaining a first position on the tube wall of said fluorescent lamp at a constant, coldest point, surface temperature, said temperature being lower than the surface temperature of any other position on said tube wall.

12. A light quantity stabilizing apparatus, comprising:

a fluorescent lamp;

a scanned plane, said plane being arranged to be illuminated by said lamp;

a lens system for forming an image of light reflected by said plane on a prescribed position;

an element for receiving said light reflected by said plane and for outputting an analog signal;

an A-D converter for converting an analog signal from said light receiving element to a digital signal;

means for generating a digital tube current control signal of a prescribed value;

a D-A converter for converting said digital tube current control signal to a second analog tube current control signal;

an inverter for controlling the tube current of said fluorescent lamp on the basis of said second analog tube current control signal; and means for changing said prescribed value of said digital tube current control signal on the basis of said digital signal from said A-D converter so that said digital signal from said A-D converter reaches a constant value and means for supplying the changed tube current control signal to said D-A converter.

13. A light quantity stabilizing apparatus in accordance with claim 12, further including means for maintaining a first position on the tube wall of said fluorescent lamp at a constant, coldest point, surface temperature, said temperature being lower than the surface temperature of any other position on said tube wall.

14. A method of stabilizing the quantity of light of a fluorescent lamp, comprising:

detecting the quantity of light of said fluorescent lamp that has first been reflected off a reference density image and outputting a detection signal corresponding to the value of said detected light quantity;

performing feedback control so that the detected light quantity reaches a constant value while producing a tube current control signal for controlling the tube current of said fluorescent lamp; and holding steady said tube current control signal when said detected light quantity reaches said constant value so as to control said tube current on the basis of said steady tube current control signal.

15. A method in accordance with claim 14, further including a step of maintaining a prescribed position on the tube wall of said fluorescent lamp at a constant surface temperature, said temperature being lower than the surface temperature of any other position on said tube wall.

16. A scanning apparatus, comprising:

a fluorescent lamp;

means for heating, controlling and detecting the surface temperature of the tube wall of said lamp whereby a first position on said tube wall can be controlled by heating said position to a prescribed temperature, said prescribed temperature being higher than the coldest temperature of said fluorescent lamp;

a heat transfer layer, said layer being formed by a material having high thermal conductivity, said heat transfer layer being in contact with said tube wall at a position other than said first position to maintain the tube wall at said other position at the coldest temperature; and a heat storage layer, said heat storage layer overlapping said heat transfer layer, said heat storage layer having lower thermal conductivity than said heat transfer layer.

17. A light quantity stabilizing apparatus in accordance with claim 9, 11 or 13, wherein said temperature maintaining means includes:

means for heating, controlling and detecting the surface temperature of said tube wall whereby a second position on said tube wall can be controlled by heating said second position to a prescribed temperature, said prescribed temperature being higher than said coldest point temperature;

a cooling device which is in contact with said tube wall at said first position for cooling the tube wall at said first position to thereby maintain said first position at said coldest point temperature;

a temperature sensor for detecting the temperature of said first position and for outputting a signal corresponding to said coldest point temperature; and a cooling device driver for driving said cooling device so as to maintain the temperature at said first position at a constant temperature on the basis of said signal outputted from said temperature sensor.

18. A light quantity stabilizing apparatus in accordance with claim 9, 11 or 13, wherein said temperature maintaining means includes:

means for heating, controlling and detecting the surface temperature of said tube wall whereby a second position on said tube wall can be controlled by heating said second position to a prescribed temperature, said prescribed temperature being higher than said coldest point temperature; and a thermal conduction buffer member, said member including a first heat storage layer, said layer being formed of a material having low thermal conductivity, said member being in contact with said tube wall at said first position.

19. A light quantity stabilizing apparatus in accordance with claim 18, wherein said thermal conduction buffering member further includes a second heat transfer layer, said second layer overlapping said first layer, said second layer having higher thermal conductivity than said first layer, said second layer being in contact with said tube wall.

20. A light quantity stabilizing apparatus in accordance with claim 18, wherein said thermal conduction buffering member further includes a heat radiation layer, said heat radiation layer overlapping said heat storage layer, said heat radiation layer having higher thermal conductivity than said heat storage layer, said heat storage layer being in contact with said tube wall.

21. A light quantity stabilizing apparatus in accordance with claim 18, wherein said thermal conjunction buffering member further includes a heat transfer layer and a heat radiation layer, said heat transfer layer and said heat radiation layer overlapping both sides of said heat storage layer, said heat transfer layer and said heat radiation layer having higher thermal conductivity than said heat storage layer, and said heat transfer layer being in contact with said tube wall.

* * * * *